Feb. 13, 1945.  W. BRANDL  2,369,526
WATER HEATER
Filed Oct. 24, 1942
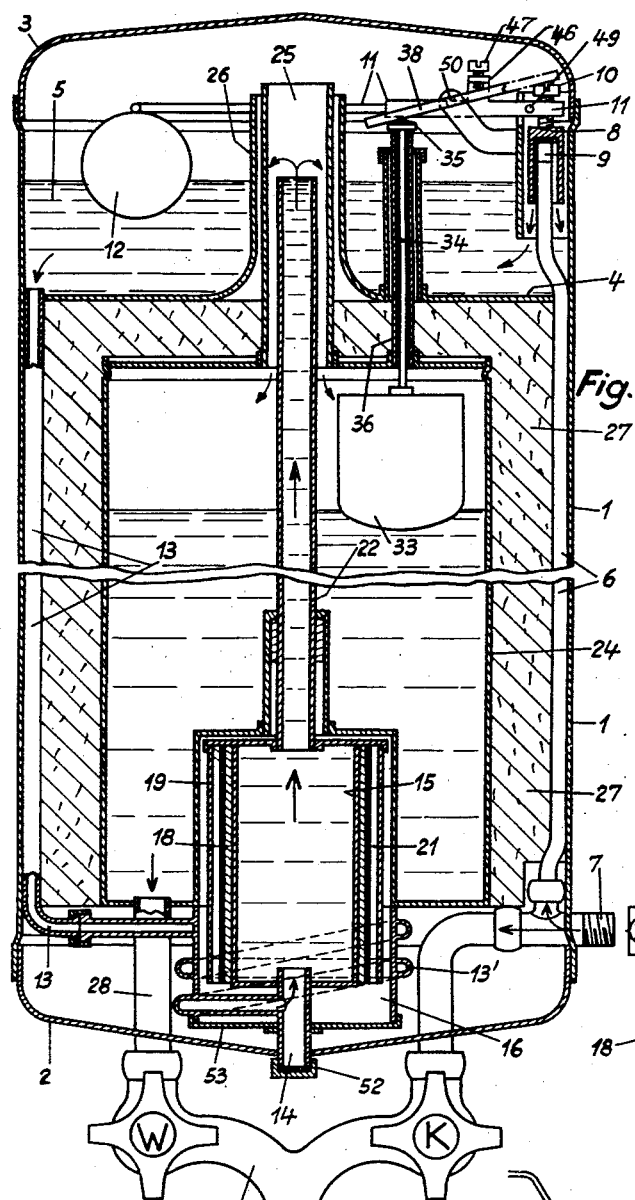
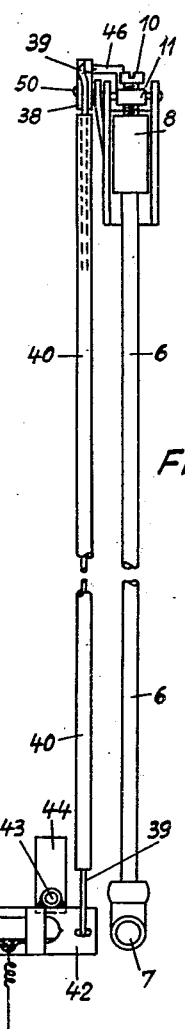
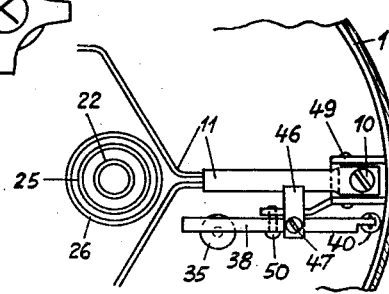

Patented Feb. 13, 1945

2,369,526

UNITED STATES PATENT OFFICE 2,369,526

WATER HEATER

Willi Brandl, Zurich, Switzerland; vested in the Alien Property Custodian

Application October 24, 1942, Serial No. 463,175

4 Claims. (Cl. 219—39)

This invention relates to a water heater for the production of hot water of the type wherein the water is heated during its passage through a heating element. The invention especially refers to that type of apparatus which is provided with a fresh water chamber, a hot water chamber and an upcast pipe connecting heating element and hot water chamber.

According to the present invention the supply of water to the fresh water chamber is controlled by the water level in the said fresh water chamber and also by the water level in the hot water chamber.

The form of construction shown in the accompanying drawing prevents the mixture of hot and cold water which often occurs in known constructions of water heater. According to this invention water is heated after every discharge of hot water. This invention also obviates the necessity to make use of thermostatic devices and the like.

One preferred embodiment of the invention is diagrammatically illustrated in the accompanying drawing.

Fig. 1 is a sectional elevation,

Fig. 2 is a view of a detail, and

Fig. 3 is a top view of another detail.

The apparatus shown in the drawing consists of a cylindrical casing 1 provided with a bottom 2 and a cover 3. Above the wall 4 there is provided the fresh water chamber 5. The cold water enters chamber 5 through a pipe 6 connected to the main supply pipe 7. The outlet opening 9 of pipe 6 is controlled by a valve 8 which is actuated by the float 12 by means of lever 11 and an adjustable screw bolt 10. From chamber 5 the water flows through pipes 13, coil 13', pipe 14 into the heating element 15. Element 15 is surrounded by a casing 16 so as to reduce the dissipation of heat. Heating element 15 is of cylindrical shape and an electric heating body 18 is arranged on its cylindrical wall. Heating body 18 is connected to the mercury switch 20 (see Figure 2) and thereby to the electrical mains not shown in the drawing. In order to further minimize the dissipation of heat an intermediate cylinder 19 is disposed between heating element 15 and casing 16 so as to leave an annular chamber 21 around heating element 15. Heat which might pass through the casings 16 and 21 is not lost, as it is transmitted to the water contained in chamber 24. An upcast pipe 22 leads from the heating element 15 through the hot water chamber 24 upwards into a pipe 25 disposed within tube 26. Tube 26 ends above the water level in the chamber 5. A lagging of cork or of other suitable material 27 is packed between the walls of the chamber 24 and the outer casing 1. The chamber 24 is connected at its lower end by a pipe 28 to the tap 30 which is also connected to the main supply pipe 7. Hot water is fed to the outlet 31 by actuating tap W and cold water by turning tap K.

A float 33 is arranged in the hot water chamber 24. The said float bears a vertical rod 34 provided with a knob 35 which is adapted to bear against the upper end of a tube 36. A double-armed lever 38 cooperates with the knob 35. A rod 39 is secured to the said lever 38 at its end lying opposite to the knob 35. Rod 39 is guided in a vertical tube 40 and swingably connected at its lower end to a plate 42. Plate 42 is excentrically and rotatably mounted on a bolt 43 and bears the mercury switch 20. Bolt 43 is fixed to a lap 44 secured to the outside of chamber 24. Above the lever 38 there is provided a screw 47 screwed into a lap 46. Screw 47 is adapted to cooperate with the lever 38. Lap 46 is fixedly secured to the float lever 11 which is rotatable about pin 49. Double-armed lever 38 is rotatable about bolt 50.

The operation of the above described apparatus is as follows:

When the cold water tap K is turned on, the cold water coming from the supply pipe 7 flows through the outlet 31. When, however, the hot water tap W is turned on, hot water coming from the hot water chamber 24 flows through pipe 28 to the outlet 31. As the water level in the chamber 24 sinks, float 33 sinks also until knob 35 bears against tube 36 as shown in Figure 1. Plate 42 which is excentrically mounted on bolt 43 swings by gravity in anti-clockwise direction and pushes rod 39 upwardly, thereby turning lever 38 about its axis 50 until one arm of the said lever 38 bears against knob 35. In this position of the switch 20 the electrical circuit to the heating coil 18 is closed. Heating coil 18 heats the water contained within the element 15 to the desired temperature. When this temperature is reached, the water is forced through pipe 22 in the direction of the arrows shown in Figure 1. The water flows into the hot water chamber 24. Cold water flows from chamber 5 through pipe 13 into the heating element 15. When the water level in the chamber 5 sinks, float 12 opens valve 8 and cold water flows from the main supply pipe 7 into the chamber 5. The water column contained in the pipe 13 and in coil 13' has enough inertia to force the hot water through the pipe 22 upwardly without the formation of steam and in such a way, that a return swing of the column of water in the pipes 13 and 13' does not occur.

When the hot water tap W is closed there is still water flowing through pipe 6, chamber 5, pipe 13, heating element 15 and pipe 22 into the hot water chamber 24 and this until chamber 24 is nearly filled. Then float 33 is able to swing lever 38 about its axis whereby plate 42 is swung about bolt 43 and the electrical circuit is opened by the mercury switch 20. The flow of pre-heated water stops and float 12 closes valve 8 as soon as the water level in the chamber 5 has reached the desired height. There is now no water flowing through the apparatus and chamber 24 is filled with hot water.

Should there be for any reason an interruption in the flow of water in the parts 6, 5, 13, 14, 15, 22, 25 of the apparatus when the heating element is switched on, the heating coil 18 would be damaged. In order to prevent this, screw 47 of the lever 11 presses upon the double-armed lever 38 as soon as float 12 sinks, thereby swinging lever 38 in such a way about its axis 50 that rod 39 tilts plate 42 and mercury switch 20 so as to interrupt the electric circuit. As soon as the water flows again float 12 is lifted and lever 38 is free to move. Switch 20 closes the electric circuit to the heating coil 18 and the apparatus continues to work until chamber 24 is filled with hot water.

Cover 3 and bottom 2 as well as the other covers 52 and 53 allow an easy cleaning of the chambers and pipes. In the entire device there are no valves except for the taps K and W disposed outside of the apparatus. It is obvious that any other switch might be used instead of the mercury switch 20 above referred to. Instead of an electrical heating element provision might be made for heating the water by means of gas or coal. The hot water flowing upwardly through pipe 22 heats the water contained in the chamber 24 and keeps the same at a constant temperature.

At least one further hot water container communicating with chamber 24, disposed outside the casing 1 might be connected to the tube 28. When hot water is withdrawn from chamber 24 or from one of the said communicating containers, the device begins to work as above described. This construction has the advantage that only one central water heater must be provided for several taps.

Float 12 is adjusted by screw 10 in such a way, that the water level in the chamber 5 corresponds substantially to the upper end of the upcast pipe 22 so that shortly after starting the heating of the heating element 15 hot water leaves pipe 22 and flows into chamber 24. It is of course also possible to adjust float 12 in such a way, that the water level in the chamber 5 lies above or below the outlet opening of pipe 22. In this manner the temperature of the hot water can be adjusted. When the level of the water in the chamber 5 is below the upper end of pipe 22 a temperature of 97° C. can be attained. Inversely, when the water level is above the upper end of pipe 22 lower temperatures are obtained.

Below the hot water chamber 24 there might be provided a heating plate conveying heat to the bottom of the said chamber 24. This heating plate can be arranged to be switched on together with or separately of switch 20.

I claim:

1. In a device of the character described, the combination of a cold water tank, a hot water storage chamber, a heater compartment in said chamber, a heater for said heater compartment, a pipe leading from said compartment into said chamber, a pipe leading from the tank to said compartment, floats in said tank and chamber respectively, means for energizing the heater, and means operative upon movement of said floats in different directions for controlling the energization of said heater.

2. In a device of the character described, the combination of a cold water tank, a hot water storage chamber, a heater compartment in said chamber, a heater for said compartment, a pipe extending from said compartment to communication with said chamber, a pipe between the tank and said compartment, means for energizing the heater, floats in the tank and in the chamber respectively, and means operative upon movement of said floats in opposite directions for controlling the energization of said heater.

3. In a device of the character described, the combination of a cold water tank, a hot water storage chamber, a heater compartment, a pipe extending from the heater compartment to communicate with said chamber, a pipe leading from said tank to said compartment, a heater for said compartment, means for energizing said heater, and means operative upon upward movement of the float in the chamber and also operative upon downward movement of the float in the tank for rendering the heater energizing means operative.

4. In a device of the character described, the combination of a cold water tank, a hot water storage chamber, a heater compartment, a pipe extending from said heater compartment to communication with said chamber, a pipe extending from the tank to the heater compartment, a heater for the compartment, means for energizing said heater, floats in said tank and chamber respectively, a cold water supply valve under control of the float in the cold water tank, a lever under control of the heater energizing means in engagement with the float in the chamber, whereby movement of the float in the chamber acts through said lever on said heater energizing means, and means on the lever of the float for the cold water tank engaging the lever maintained in engagement with the float in the hot water storage chamber for effecting movement of said lever and control of the heat energizing means upon movement of said float in the cold water tank in a predetermined direction.

WILLI BRANDL.